United States Patent [19]

Albrecht et al.

[11] Patent Number: 4,773,843

[45] Date of Patent: Sep. 27, 1988

[54] APPARATUS FOR TREATING BLANKS OF PLASTIC MATERIAL

[75] Inventors: Peter Albrecht, Hamburg; Adolf Appel, Egestorf; Wolfgang Reymann, Hamburg; Klaus Vogel, Barsbüttel; Hermann Werner; Walter Wiedenfeld, both of Hamburg, all of Fed. Rep. of Germany

[73] Assignee: Krupp Corpoplast Maschinenbau GmbH, Hamburg, Fed. Rep. of Germany

[21] Appl. No.: 128,012

[22] Filed: Dec. 2, 1987

[30] Foreign Application Priority Data

Feb. 25, 1987 [DE] Fed. Rep. of Germany ....... 3705946

[51] Int. Cl.⁴ ............................................. B29C 69/00
[52] U.S. Cl. .................................. 425/324.1; 269/56; 425/445; 425/DIG. 201
[58] Field of Search ................. 425/60, 161, 317, 404, 425/324.1, 445, 446, DIG. 201; 269/37, 40, 56, 57, 86; 198/406, 408, 425, 470.1, 478.1; 414/910

[56] References Cited

U.S. PATENT DOCUMENTS

| | | | |
|---|---|---|---|
| 2,510,678 | 6/1950 | Bower | 425/445 X |
| 2,937,428 | 5/1960 | Pocidalo | 425/161 X |
| 3,192,561 | 7/1965 | Archer et al. | 425/324.1 |
| 3,197,013 | 7/1965 | Van Der Winden | 198/408 X |
| 3,853,091 | 12/1974 | Christensen et al. | 269/57 X |
| 4,021,177 | 5/1977 | Kaiser et al. | 425/324.1 X |
| 4,388,059 | 6/1983 | Ma | 425/324.1 X |
| 4,508,025 | 4/1985 | Schultz | 198/406 X |
| 4,693,055 | 9/1987 | Olsen, Jr. et al. | 198/425 X |
| 4,697,691 | 10/1987 | Zodrow et al. | 198/425 |
| 4,735,761 | 4/1988 | Lindenberger | 425/DIG. 201 |

Primary Examiner—Richard L. Chiesa
Attorney, Agent, or Firm—Panitch Schwarze Jacobs & Nadel

[57] ABSTRACT

An apparatus for treating blanks of plastic material comprising a substantially cylindrical main frame structure, a central, coaxial cam drum which is mounted within same rotatably about its longitudinal axis and which is provided on its outside with working cams, and a plurality of treatment stations arranged in juxtaposed relationship around the periphery of the frame structure, with tools for processing the plastic blanks. The tools in a respective station are carried by vertically movable carriages, each of which is adapted to be moved up and down in the station by a cam follower guided by an associated cam on the cam drum. Each cam follower is carried by a drive carriage. The respectively associated tool carriages and drive carriages are each independently guided on the housing by vertical guide means and are interconnected by way of non-rigid connecting means. The guide means for the carriages are arranged in projection on to a plane perpendicularly to the direction of movement of the respective carriage, between the cam follower and the point at which a reaction force resulting from treatment of a said blank acts on the tool carriage.

11 Claims, 5 Drawing Sheets

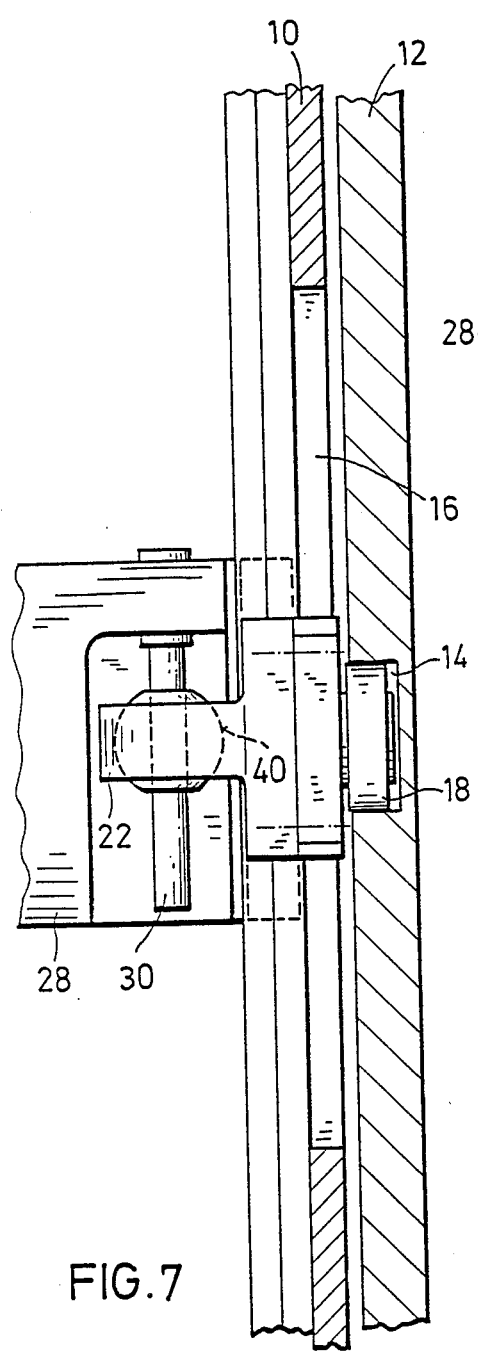
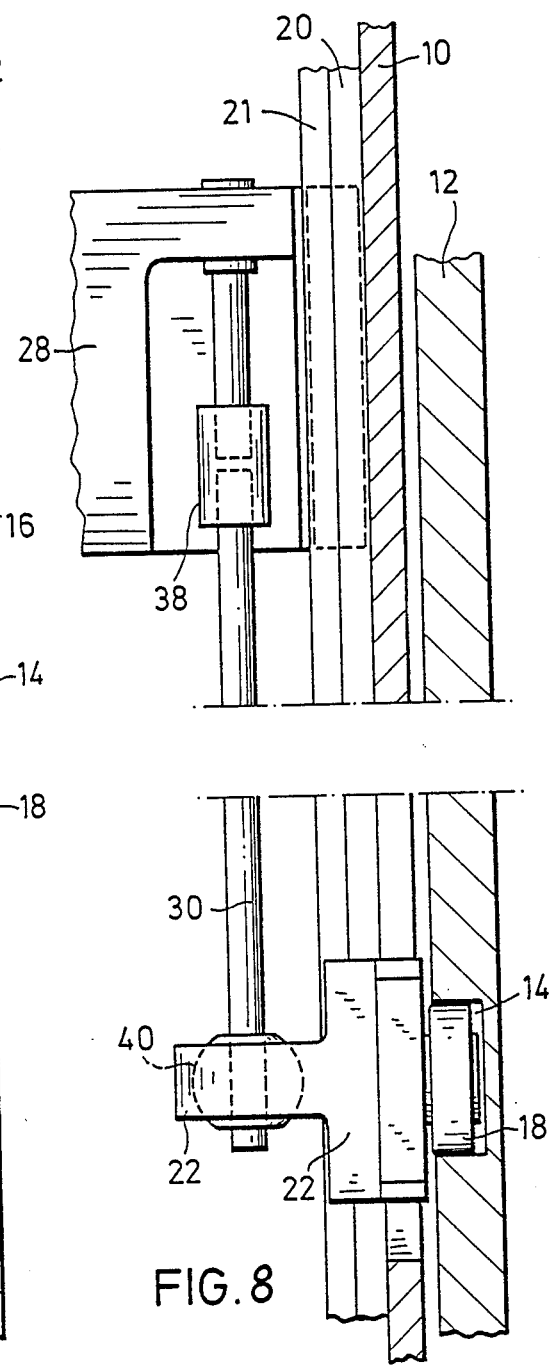
FIG. 7
FIG. 8

APPARATUS FOR TREATING BLANKS OF PLASTIC MATERIAL

BACKGROUND OF THE INVENTION

The present invention relates generally to an apparatus for treating blanks or molded items of plastic material, to put the blanks into various forms.

In treating blanks of plastic material, what is predominantly involved is shaping operations, in the course of which the general configuration of the blank is subjected to change. Such treatment operations may be carried out by means of an apparatus comprising an at least generally cylindrical main frame structure, the longitudinal axis of which extends vertically, and a central cam-bearing drum which is arranged in coaxial relationship with the frame structure and which is mounted rotatably about the longitudinal axis and which is provided on the outside with a plurality of peripherally extending operating cams, and a plurality of treatment stations which are arranged in side-by-side relationship around the periphery of the frame structure, the treatment stations having tools which are operable to carry out processing or treatment operations on the plastic blanks. The tools may be carried by vertically movable tool carriages, each of which can be moved up and down by a cam roller which is guided by means of a cam on the rotatable drum.

When reference is made hereinbefore and also hereinafter in this specification to the main frame structure being of generally cylindrical configuration, that is intended to mean that the frame structure is of a peripheral configuration. While therefore it may be at least substantially cylindrical in the strict sense, it may also be in the form of a polygonal cross-section or in the form of a hollow cylinder with flat portions at the peripheral surface thereof.

When using such an apparatus for carrying out operations for changing the shape of a plastic blank, it may be necessary to apply considerable forces which have to be transmitted to the tools from the cams on the cam drum. As the treatment stations with the operating tools are mounted on the main frame structure on the outside thereof, they will normally project outwardly therefrom so that there is a generally radial spacing between the cam drum which is arranged within the frame structure and the vertical plane or axis in which the tools are moved to produce the shaping effect on the blank. Now, it will be seen that the above-mentioned forces required for shaping the blank have to be transmitted across the radial spacing mentioned above, with the result that the forces occurring in the shaping operation give rise to the generation of moments, the magnitude of which also increases with an increasing spacing between the cam drum and the point at which the forces act on the respective tool carriage. In that connection, account is to be taken of the fact that it is not possible for the spacing between the cam drum or the cam follower rollers which are guided thereby, and the associated tool, to fall below a certain minimum value as the arrangement must include guides for the holders carrying the tool which must therefore be disposed in the above-mentioned spacing, while in addition, in order to provide for a certain degree of ease of monitoring and gaining access to the tools and other associated components, they must be displaced somewhat outwardly relative to the housing frame structure of the apparatus.

SUMMARY OF THE INVENTION

An object of the present invention is to provide an apparatus for treating blanks of plastic material, which is of a simple construction consistent with suitably carrying forces and moments which occur in operation thereof.

Another object of the present invention is to provide an apparatus for treating plastic blanks, having a rotatable cam drum and a plurality of treatment stations arranged therearound, the drum being operable to displace tools carried by vertically movable tool slides or carriages, for carrying out treatment operations on the blanks, wherein the moments which occur in operation of the apparatus due to the generally radial spacing between a respective cam follower member and a tool or the mounting means thereof are minimized.

Still a further object of the present invention is to provide an apparatus for treating plastic blanks which, while being of a simple construction, ensures a high level of operational reliability, easy access to the components thereof and facilitated monitoring and maintenance of the apparatus structure.

Yet another object of the present invention is to provide an apparatus for treating plastic blanks which provides for the transmission of shaping forces to the blanks in a way which is advantageous in terms of the mechanical stresses generated in the components which are operative in that respect.

In accordance with the present invention, these and other objects are achieved by an apparatus for treating blanks of plastic material, comprising an at least substantially cylindrical main frame structure having a generally vertically extending longitudinal axis, and a central cam-bearing drum which is mounted in coaxial relationship with said main frame structure rotatably about said longitudinal axis, the drum being provided on its outside with operating cams extending in the peripheral direction thereof. Arranged in juxtaposed relationship around the periphery of the frame structure are a plurality of treatment stations including tools adapted to carry out treatment operations on the blanks, the tools being carried by vertically movable tool slides or carriages, each of which is adapted to be moved up and down by a cam follower roller guided by a cam on the cam drum. The cam follower roller in each station or associated with each tool is carried by a drive carriage, and the tool carriages and the drive carriages are each guided for themselves on the main frame structure and are interconnected by way of non-rigid connecting elements. Vertically extending guide means for the tool carriages and the drive carriages are arranged in the projection onto a plane perpendicularly to the direction of movement of the tool and drive carriages, between the respective cam follower roller and the point at which the reaction force resulting from the treatment operation carried out on a said blank acts on the tool carriage.

The fact of using two carriages which are interconnected in respect of the forces involved, for the transmission of force from the cam follower roller to the respective tool carried by the tool carriage, and the resulting possibility of the two carriages, namely the drive carriage and the tool carriage, being guided independently of each other on guide means which extend between the cam on the cam drum and the point of engagement of the above-mentioned reaction force, means that the spacing between the cam follower roller and the point of engagement of the reaction force is divided up in such a way as to give more advantageous lever arm relationships than in a previous construction. The tilting moments which are produced by the forces acting on the respective drive carriage are carried by the guide system which is provided for guiding the drive carriages. The tilting moments generated by the forces acting on the tool carriage are carried by the guide system provided for guiding the tool carriages, so that the sum of all tilting moments is distributed to the two guide systems in question.

In order to provide an arrangement which is of the utmost simplicity and which is easy to monitor and maintain, it may be desirable for the drive carriages and the tool carriages to be guided on common guide means. In that respect there is the option of the guide means for the tool carriages and the drive carriages being arranged in the same plane. That will be the case in particular when the drive carriages and the tool carriages are guided on common guide elements.

In a particularly advantageous embodiment of the apparatus in accordance with the present invention, there are two mutually parallel spaced-apart guide bars or rails, the mutually facing sides of which carry or provide the guide surfaces for the respective drive carriage while the sides of the guide bars or rails which face away from each other provide or carry the guide surfaces for the tool carriage. It is also possible to envisage a reversal of that arrangement although that is less advantageous as the drive carriage carries the respective cam follower roller and should therefore be arranged at an inward position, that is to say, closer to the cam drum than the associated tool carriage. In that connection, the main frame structure is to have an aperture for a connecting member between the cam follower roller and the drive carriage to pass therethrough. An arrangement in which the mutually facing sides of the guide bars or rails carry or provide the guide surfaces for the respective drive carriage makes it possible for the above-mentioned aperture to be disposed between the two guide bars or rails of each treatment station.

The above-described apparatus configuration in which the drive carriage and the tool carriage in a treatment station are combined together, that is to say, are interconnected, in respect of the forces involved, to provide a respective unit, but which are each independently guided, affords the option in accordance with a further aspect of the principles of the present invention of interconnecting the respective drive carriage and tool carriage by way of a connecting element for transmitting the force involved. The length of the connecting element, which determines the vertical spacing between the two associated carriages, may be adjustable. In that way it is possible for the position of the tool carriage to be adapted to the respective requirements involved, that is to say for example the location of the station in which the treatment operation is carried out on the blank, without thereby at the same time also fixing the position of the drive carriage. On the contrary, depending on the conditions in respect of space and independently of the position of the respective tool carriage, the drive carriage may be arranged at a location where the cam required for actuation of the operating unit consisting of the respective drive carriage and tool carriage is mounted on the cam drum. That option is an aspect of major significance for the reason that in many cases a treatment station must include a plurality of tools which are actuated independently of each other, with the tools which are arranged for example in coaxial relationship with each other being at only a very small spacing from each other, at least in certain relative positions with respect to each other, which spacing for example may be smaller than the vertical extent or dimension of a cam. That means that in many cases it will not be possible for the cams for actuating a plurality of tools in a respective operating station to be arranged at such small spacings from each other, in which respect such spacings may even be almost nonexistent, as is the case in regard to the corresponding tools. The configuration of the apparatus in accordance with the invention makes it possible for the cams for actuating the treatment means or tools in a treatment station to be arranged independently of the position of the respective tools, and the spacing between the drive carriages associated with the respective cam follower rollers, and the associated tool carriages, may be determined by way of the connecting elements which are adjustable in respect of their length.

In accordance with a further feature of the invention, the above-mentioned connecting element may be in the form of an overload coupling means or may be provided with an overload coupling means which, if some operational circumstances result in an inadmissibly high level of force loading, responds and releases the force-transmitting communication between the tool and drive carriages of a respective operating unit.

The connecting element is advantageously in the form of a rod or bar which will normally extend vertically.

Further objects, features and advantages of the present invention will be apparent from the following description of preferred embodiments thereof.

BRIEF DESCRIPTION OF THE DRAWINGS

FIG. 7 is a diagrammatic view in longitudinal section through the main frame structure and the cam drum of a further embodiment, FIG. 8 is a view corresponding to that shown in FIG. 7, in which the two co-operating carriages of a respective operating unit are in a different relative position with respect to each other.

DESCRIPTION OF THE PREFERRED EMBODIMENTS

Figure 1:
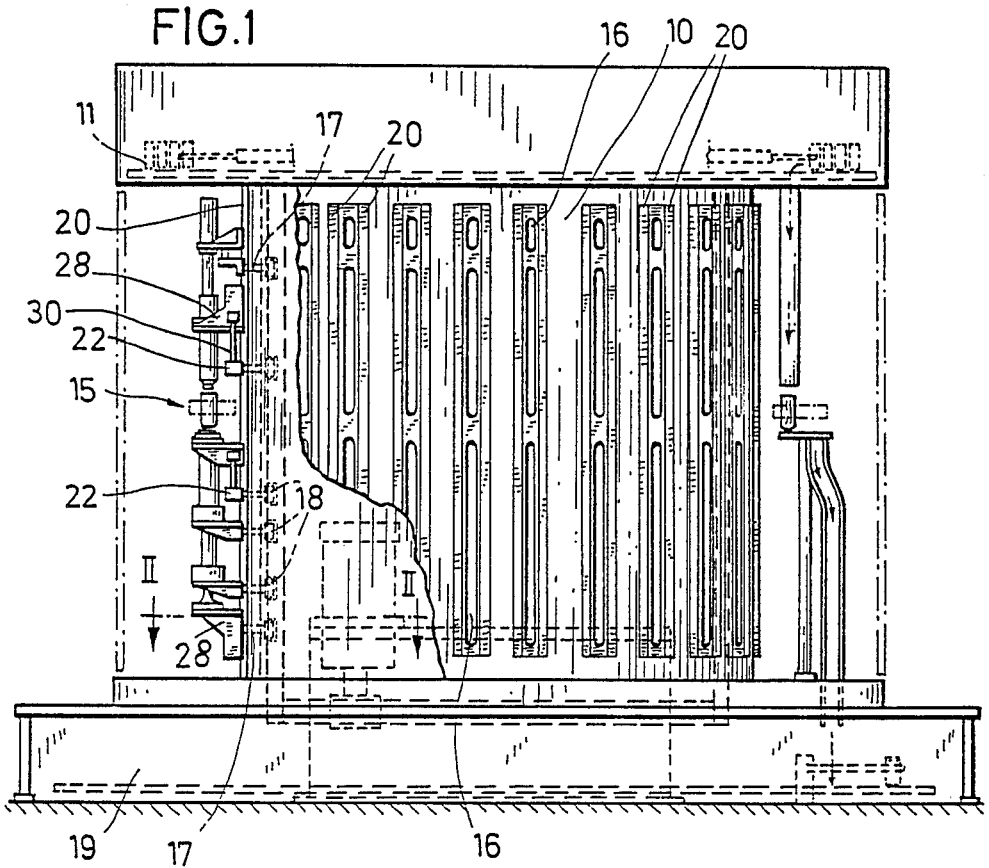
FIG. 1 is a diagrammatic side view, of an apparatus for treating plastic blanks.
Figure 2:
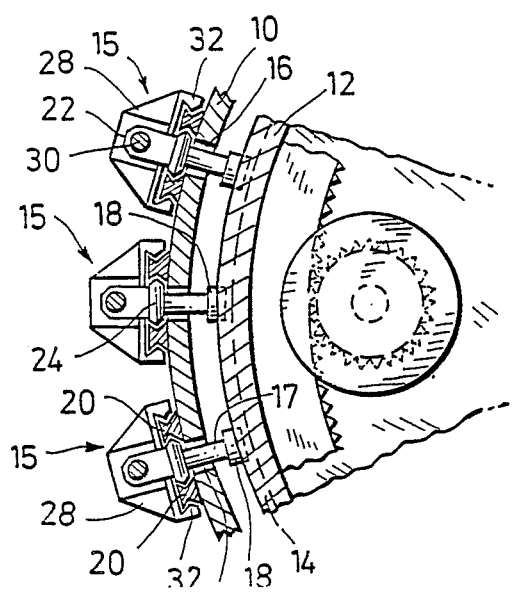
FIG. 2 is a view in section taken along line II—II in FIG. 1.
Figure 3:
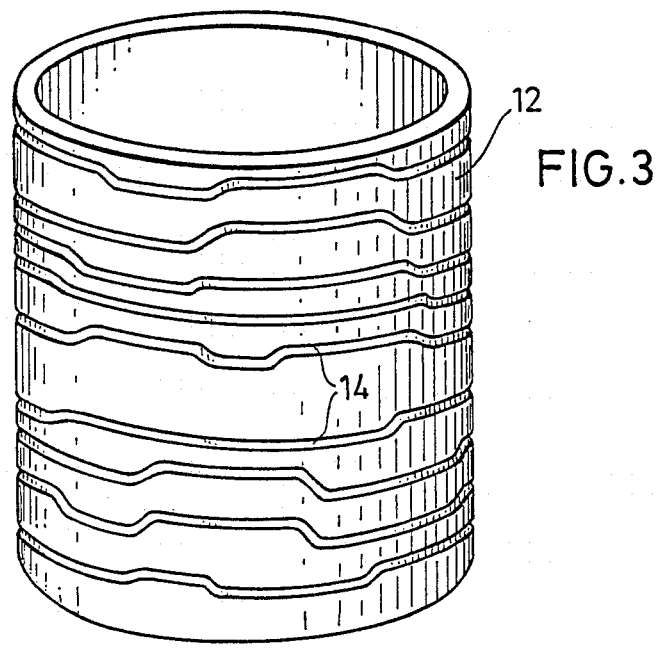
FIG. 3 is a perspective view of a cam-bearing drum which is arranged within the stationary main frame structure of the apparatus.
Figure 4:
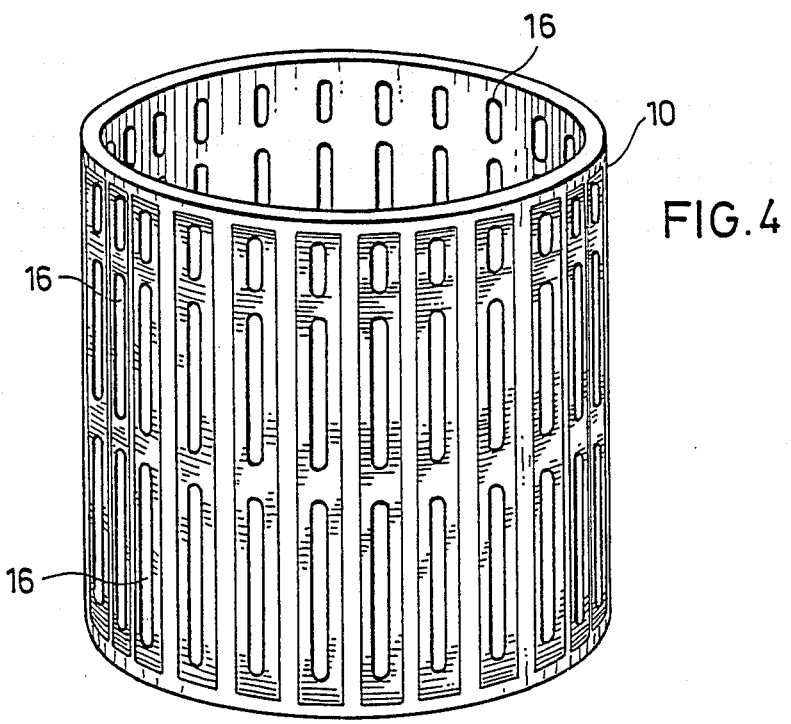
FIG. 4 is a perspective view of the main frame structure without additional components thereon.

Reference will first be made to FIGS. 1 through 5 to discuss the basic structure of the apparatus generally. The apparatus comprises a main frame structure 10 which is approximately circular in cross-section, and a central cam-bearing drum 12 which is mounted rotatably in coaxial relationship within the main frame structure 10. The drum 12 is provided on its outside with a plurality of vertically spaced-apart peripherally extending operating cams 14 which can be clearly seen from FIG. 3. In addition, the main frame structure 10 carries a plurality of treatment stations 15 which are arranged on the outside thereof in side-by-side relationship at regular spacings from each other in the peripheral direction of the frame structure 10. Each of the treatment stations 15 has associated therewith a plurality of vertically extending slots 16 in the main frame structure 10, for at least one shaft or spindle 17 for a cam follower roller 18 to pass therethrough. The slots 16 are clearly visible in FIG. 4 and can also be seen in the general context of the apparatus, in FIG. 1.

The blanks or molded items which are to be processed in the apparatus according to the invention are fed to the upper region 11 of the apparatus, as indicated in FIG. 1, from a suitable device which contains for example a store of blanks. From the upper region 11 of the apparatus, the blanks are passed by way of a suitable conveyor means to the treatment stations 15. The treatment stations are connected in parallel relationship with each other, in other words, each blank passes through only one station 15. In the lower region of the apparatus as indicated at 19 in FIG. 1, the treated blanks are collected and transported away from the apparatus. Details of the transportation means are not illustrated as they are generally conventional in nature.

Provided in each treatment station 15 on the outside of the main frame structure 10 are first and second linear guides which extend in parallel relationship to the slots 16 and thus vertically. In the embodiment illustrated for example in FIGS. 1 through 5, the guides are in the form of guide bars or rails as indicated at 20 and which can be clearly seen in cross-section in FIG. 2. The slots 16 are arranged in the centre between each two guide bars 20 at a treatment station 15, as can also be clearly seen in FIG. 2. At their mutually facing sides and at their sides which face away from each other, the respective guide bars 20 are provided with prism-like or V-shaped, groove-like guide surfaces 21 and 23. That configuration can be seen from FIG. 2 and also on a larger scale from FIG. 5.

Each of the treatment stations 15 has associated therewith a plurality of drive slides or carriages 22, each of which is provided with a cam follower roller 18 co-operating with a cam of the cam drum 12, and a guide block or member 24. Each guide member 24 has guide surfaces 25 which are of a V-shape or prism-like configuration, in projecting relationship, corresponding to the co-operating configuration of the guide surfaces 21, at each of the two sides of the guide member 24 which are towards the respective guide bars 20. The guide surfaces 25 of each guide member 24 are in engagement with respective ones of the two guide bars 20 so that the drive carriage 22 is guided by the two guide bars 20 in the upward and downward movement which is transmitted thereto by the cams 14 associated therewith, by way of the respectively associated cam follower roller 18. The two guide bars 20 are provided with bearing rollers indicated at 26 in FIG. 5, at their guide surfaces 21 and 23 respectively.

Associated with each drive carriage 22 is a tool carriage 28 which carries the tools required for the respective operations to be carried out on the plastic blanks. For reasons of enhanced clarity of the drawings, the tools are only indicated therein, especially as the specific configurations thereof will depend on the respective kind of treatment to which the blanks are to be subjected.

Figure 5:
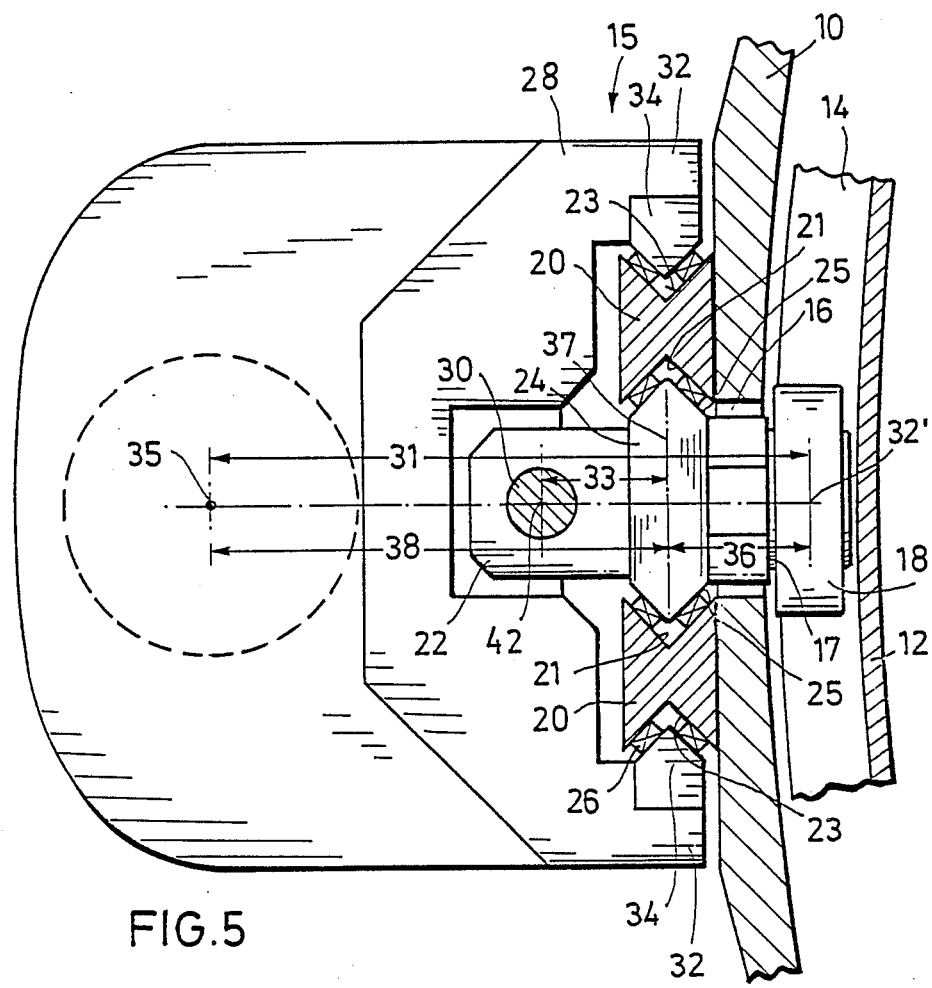
FIG. 5 is a view in the direction indicated by the arrows V—V in FIG. 9.

Reference will now be made more particularly to FIG. 5 showing that at the side of the tool carriage 28 which is towards the frame structure or housing 10, the tool carriage 28 is provided with first and second projections 32 which embrace the associated pair of guide bars 20 on the outsides thereof. Each projection 32 is provided at its side towards the adjacent guide bar 20 with a guide element 34 whose cross-sectional shape and dimensions are adapted to those of the outside guide surfaces 23 on the two guide bars 20 so that the guide elements 34 engage into the outward guide configurations formed by the outward guide surfaces 23 of the two guide bars 20. At that location also bearing rollers 26 are provided to guide the tool carriage 28. Thus, the drive carriage 22 and the tool carriage 28 at the respective treatment station are guided on the same guide bars 20 but independently of each other at different guide surfaces. As the cam follower roller 18 of the respective drive carriage 20 co-operates with the cam drum 12 which is within the main frame structure or housing 10, the illustrated arrangement in which the drive carriage 22 is between the two guide bars 20 while the tool carriage 28 is arranged in front of the guide bars 20 and engaging therearound by means of its projections 32 is particularly advantageous as the slot required for the shaft or spindle 17 to pass through the frame structure or housing 10 may be disposed between the two guide bars 20 at a respective treatment station 15. Furthermore the above-described arrangement gives the advantage that, by virtue of the larger spacing between the two guide surfaces for guiding the respective tool carriage 28, the undesirable effects of the clearance which is necessarily provided in the guide means is reduced. That is particularly desirable in relation to a coaxial array of a plurality of tools, as is shown for example in FIG. 9.

The drive carriage 22 and the tool carriage 28 are connected together by way of a connecting element to provide an operating unit, although the connection is not a rigid one. The connecting element may be in the form of a rod or bar 30 which can be seen in side view in FIG. 1 and in section in FIGS. 2 and 5, so as to bridge over the vertical spacing which is possibly present between the respective tool carriage and the associated cam. The position of the tool carriage is determined by the position of the treatment station in question and the position of the tool carried by the tool carriage, in the treatment station. The position of the associated cam on the drum 12 will generally depend on the number of cams which have to be provided on the drum 12. That in turn depends on the number of tools or tool members to be actuated by the cam drum 12 in a treatment station 15, and possibly also other treatment means or members. Thus, the length of the rod 30 will depend on the respective spacing to be bridged between the position of the treatment station 15 and the position of the associated cam 14 on the cam drum 12.

By virtue of the above-described configuration, that is to say the use of two carriages or slides which are guided independently of each other, for the transmission of force from the cam follower roller 18 to the tool carried by the respective tool carriage or slide 28, the spacing as indicated at 31 in FIG. 5 between the point of engagement 32' of the force transmitted to the cam follower roller 18 by the cam drum 12, and the point of engagement of the reaction force at 35 resulting from the treatment of the blank, of the tool carried by the respective tool carriage or slide 28 is divided, that is to say, in respect of the drive carriage 22, it is provided by the lever arm 36 in FIG. 5 between the point of engagement 32' of the operating force on the cam follower roller 18 and the guide plane 37 which is common to the two associated carriages or slides 22 and 28, on the one hand, and the lever arm indicated at 33 in FIG. 5 between the point of engagement 42 of the guide element 30 and the guide plane 37 on the other hand, and in respect of the tool carriage or slide 28, it is given by the lever arm 38 between the point of engagement 35 and the guide plane 37. In other words, the moments acting on the components of the assembly are substantially smaller and can thus be better controlled in regard to the effects thereof, than when using only one carriage or slide which represents a rigid unit and which therefore would not provide better results even if it were to be guided on two or more guides, especially as the force of the connecting element 30 which acts at the point of engagement 42 on the tool carriage or slide 28 is operative between the point of engagement 35 and the guide plane 37, so that the moment resulting from the lever arm 38 and the reaction force acting at the point 35 is reduced as the force at the point 42 is in the opposite direction to the reaction force in the point 35. The non-rigidity of the connection between the drive carriage 22 and the tool carriage 28 by way of the rod 30 or some other suitable coupling element is therefore a major requirement for the above-described effects to be achieved. The non-rigidity of the connection applies not in respect of the transmission of force from the drive carriage to the tool carriage, but only in respect of a certain limited mobility substantially in a plane transversely with respect to the longitudinal extent of the coupling rod 30.

In that respect, reference will now be made to FIGS. 7 and 8 showing a construction in which the connection between the respective drive carriage 22 and the coupling rod 30 is by way of a pivot as indicated at 40. However, it will not normally be necessary to provide special structures to produce a connection which is non-rigid in the above-indicated manner, as the inevitable elastic deformability of the coupling rod and also the other members co-operating therewith is adequate to provide the non-rigid connection which is required in order to achieve the desired effect and which serves only to prevent the guide forces in respect of one carriage or slide from affecting the guide action in respect of the other carriage or slide. What is essentially involved is preventing the transmission of torques from one carriage to the other.

In the construction shown in FIG. 8 the coupling rod 30 is of a two-part construction, with the two parts being connected together by way of an overload coupling means as indicated at 38, which is intended to ensure that no components of the assembly are damaged or ruined when faults or defects occur and accordingly give rise to excessively high forces.

Figure 6:
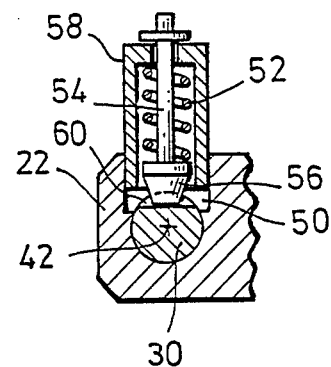
FIG. 6 shows a detail of a second embodiment.

Reference will now be made to FIG. 6 which diagrammatically shows a possible embodiment of an overload coupling means. In that construction, the drive slide or carriage 22 is provided with a lateral recess 50 in which there is disposed a pin 54 which is subjected to the biasing force of a compression coil spring 52. At its end which is towards the connecting rod 30, the pin 54 carries a head 56 which tapers conically towards its free end. The pin 54 and the spring 52 are enclosed by a housing 58 against which the compression spring 52 also bears, at its end remote from the head 56. The housing 58 is connected in some suitable manner, for example by screws (not shown), to the drive carriage 22, in the recess 50 in which it is fitted. The connecting rod 30 has a transverse recess 60 into which the head 56 on the pin 54 engages and thus makes a positive connection between the drive carriage 22 and the connecting rod 30 and therewith the tool carriage 28. Under normal operating conditions, the head 56 is held in engagement with the rod 30 or more specifically the recess 60 therein by the coil spring 52 which bears against the head 56 at the end of the spring 52 which is towards the rod 30. By suitable selection in respect of the spring 52, the taper of the head 56 and the walls defining the recess 60, which co-operate with the head 56, it is possible to set a given maximum force which is to be transmitted from the drive carriage 22 to the connecting rod 30 and thus to the tool carriage 28. If that force is exceeded, the pin 54 is displaced out of its operative position as shown in FIG. 6, against the force of the spring 52, so that the connection between the pin 54 and the rod 30 and thus the operative connection between the drive carriage 22 and the tool carriage 28 is released. It is also possible to envisage other forms of overload coupling means, using per se known structures.

It has already been mentioned that a further advantage of the separation between the respective drive and tool carriages of a treatment station is that the position of the drive carriage 22 and therewith the cam associated therewith in the cam drum 12 can be selected independently of the operating position of the tool carriage 28. In the embodiment illustrated in FIG. 8 the spacing between the two carriages 28 and 22 is comparatively large. In other words, in that situation the cam on the cam drum 12 which produces the drive effect is at a substantial vertical spacing from the associated tool carriage 28. On the other hand, in the embodiment shown in FIG. 7 the two carriages 22 and 28 are arranged in such a way that there is scarcely any vertical spacing therebetween. The two arrangements shown in FIGS. 7 and 8 respectively may be associated with the same treatment station 15, that is to say, depending on the number of treatment operations to be carried out within a respective treatment station and thus when there is a plurality of treatment tools or other blank-treating members, they may be positioned independently of the position of the respective cams on the cam drum 12, in such a manner as corresponds to the requirements obtaining in respective of the relative position of the tools and therewith also the associated operating carriages.

Figure 9:
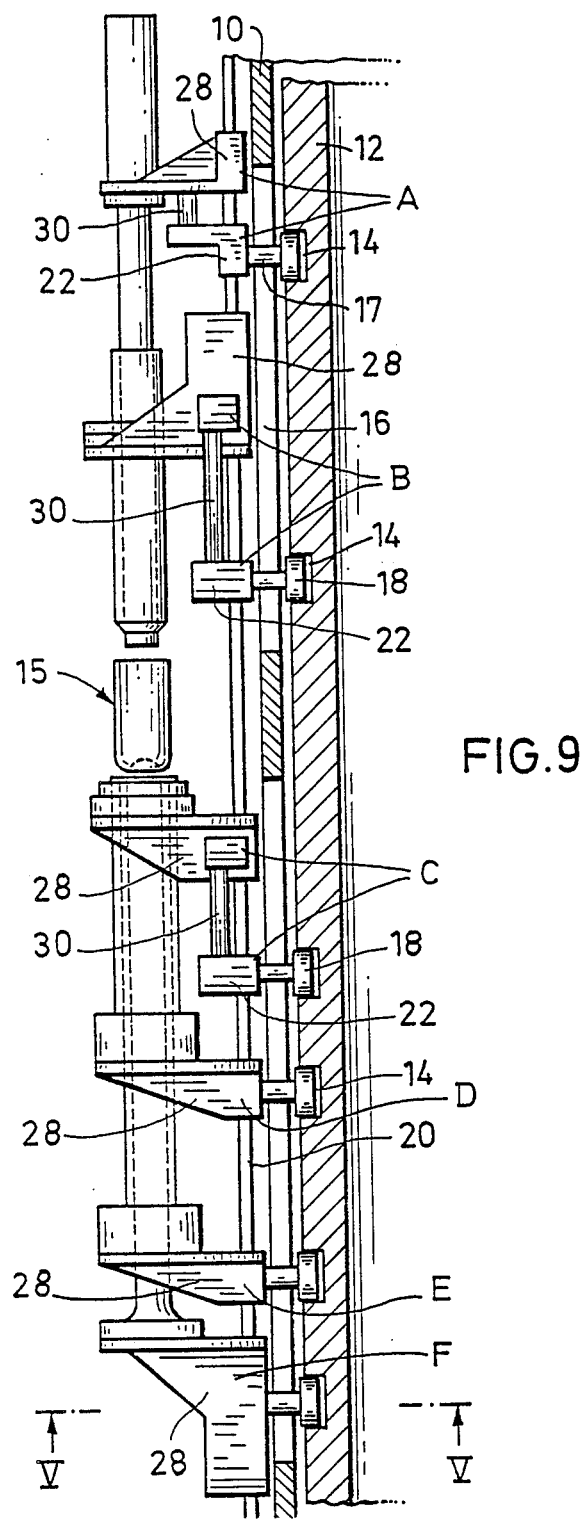
FIG. 9 is a diagrammatic view in longitudinal section through the main frame structure and the cam drum with a plurality of units which are arranged in superposed relationship and which each comprise a drive carriage and a tool carriage.

Reference will now be made to FIG. 9 showing the arrangement of a plurality of units each consisting of the drive carriage 22 and the tool carriage 28, such units being associated with the same treatment station 15. In regard to the two units A and B which are above the treatment station 15, the two associated carriages 22 and 28 are connected together by way of a respective connecting rod 30 which bridges a vertical gap between the two co-operating carriages 22 and 28. That is also the case in regard to the upper unit C of the units C, D, E and F which are disposed beneath the treatment station as indicated at 15 and which each comprise a drive carriage 22 and a tool carriage 28. On the other hand, in regard to the three lowermost units D, E and F, the tool carriage 28 is connected to the respectively associated drive carriage without any spacing therebetween, that is to say in a manner which approximately corresponds to the form of connection shown in FIG. 7. FIG. 9 further shows that the tools or the tool carriers of the tool carriages 28 which are respectively disposed above and below the treatment station under consideration are arranged in mutually coaxial relationship.

In all the embodiments illustrated and described hereinbefore the guide means for the two carriages 22 and 28 of a respective station are arranged in a common vertical plane. That is not absolutely necessary, in order to achieve the desired effect according to the invention. On the contrary it is readily possible to provide separate guide means for the two associated carriages, and to arrange for the actual guide means to extend in different vertical planes. That however would result in the guide configurations taking up a larger amount of space and for that reason the constructions described and illustrated are generally the most appropriate.

In a modified form of the illustrated constructions, the guide means may also be of different natures, for example in the form of rods or bars, which serve to guide mounting bushes or sleeves which are carried by the respective carriages or slides so that they are slidable on the guide means.

It will be appreciated that the above-described embodiments of the apparatus according to the invention have been set forth solely by way of example and illustration thereof and that various other modifications and alterations may be made therein without thereby departing from the spirit and scope of the invention.

What is claimed is:

1. Apparatus for treating blanks of plastic material, comprising a substantially cylindrical main frame structure having a vertically extending longitudinal axis, a central cam drum in coaxial relationship therewith and mounted rotatably about its longitudinal axis, a plurality of operating cams on the outside of said drum and extending substantially peripherally thereof, and a plurality of treatment stations arranged in juxtaposed relationship around the periphery of the frame structure, each station including: tool means for treating said blanks; a plurality of tool carriages carrying the respective tool means; guide means for guiding the carriage in a vertical movement on the frame structure; a plurality of drive carriages each carrying a cam follower co-operable with a respective said cam means of said cam drum; guide means for guiding said drive carriages on said frame structure; and non-rigid connecting elements interconnecting respective co-operating ones of said tool and drive carriages, said guide means for said tool and drive carriages being arranged in the projection on to a plane perpendicularly to the direction of movement of the carriages between the cam followers and a point at which the reaction force resulting from treatment of blanks engages said tool carriage.

2. Apparatus as set forth in claim 1 wherein said guide means for guiding said drive carriages and said tool carriages are common guide means.

3. Apparatus as set forth in claim 1 wherein said guide means for said drive carriages and said tool carriages are disposed at least substantially in the same plane.

4. Apparatus as set forth in claim 3 wherein said guide means for guiding said drive carriages and said tool carriages are common guide means.

5. Apparatus as set forth in claim 1 wherein said guide means for said tool and drive carriages at each station include first and second mutually parallel spaced-apart guide bars having mutually facing sides providing guide surfaces for the respective drive carriage and oppositely directed sides providing the guide surfaces for the respective tool carriage.

6. Apparatus as set forth in claim 1 wherein said connecting elements include overload release means to interrupt the respective interconnection between an associated pair of tool and drive carriages.

7. Apparatus as set forth in claim 1 wherein respective drive and tool carriages are interconnected by way of a connecting element.

8. Apparatus as set forth in claim 7 wherein said connecting element is in the form of an overload coupling means.

9. Apparatus as set forth in claim 7 wherein said connecting element is provided with an overload coupling means.

10. Apparatus as set forth in claim 7 wherein the length of said connecting element, defining the vertical spacing between associated drive and tool carriages, is adjustable.

11. Apparatus as set forth in claim 7 wherein said connecting element is in the form of a connecting bar.

* * * * *